US012508202B2

(12) United States Patent
Sridhar

(10) Patent No.: US 12,508,202 B2
(45) Date of Patent: Dec. 30, 2025

(54) VIBRATION-INDUCED TREMOR RELIEF APPARATUS

(71) Applicant: Anushka D. Sridhar, Richardson, TX (US)

(72) Inventor: Anushka D. Sridhar, Richardson, TX (US)

(*) Notice: Subject to any disclaimer, the term of this patent is extended or adjusted under 35 U.S.C. 154(b) by 916 days.

(21) Appl. No.: 17/724,249

(22) Filed: Apr. 19, 2022

(65) Prior Publication Data

US 2023/0115727 A1 Apr. 13, 2023

Related U.S. Application Data

(60) Provisional application No. 63/254,462, filed on Oct. 11, 2021.

(51) Int. Cl.
*A61H 23/02* (2006.01)

(52) U.S. Cl.
CPC ......... *A61H 23/0263* (2013.01); *A61H 23/02* (2013.01); *A61H 2201/123* (2013.01);
(Continued)

(58) Field of Classification Search
CPC ...... A61H 23/00; A61H 23/004; A61H 23/02; A61H 23/0254–0263; A61H 2023/0272; A61H 2201/5002
(Continued)

(56) References Cited

U.S. PATENT DOCUMENTS

2013/0116606 A1* 5/2013 Cordo ................ A61H 23/0263 601/46
2019/0159953 A1* 5/2019 Konczak ................ A61H 1/005
(Continued)

FOREIGN PATENT DOCUMENTS

WO WO-9715264 A1 * 5/1997 ............... A61H 1/00

OTHER PUBLICATIONS

Shah et al. "Intraoperative acceleration measurements to quantify improvement in tremor during deep brain stimulation surgery" Medical and Biological Engineering and Computing, 2017, 55 (5), pp. 845-858. ff10.1007/s11517-016-1559-9 (Year: 2017).*
(Continued)

*Primary Examiner* — Paige Kathleen Bugg
(74) *Attorney, Agent, or Firm* — Microelectronic Devices IP LLC; Shawn T. Walsh

(57) ABSTRACT

A Smart Strap includes a flexible strap having a first plurality of vibration actuators, a second plurality of vibration actuators, and a motion sensor, with a processor having a processor power source connected to the motion sensor. An actuator power source is connected to the two pluralities of vibration actuators through a first switch and a second switch, respectively. The processor is configured to read acceleration of the motion sensor at a prescribed frequency, and turn on the first plurality of vibration actuators for a first prescribed treatment time when the acceleration exceeds a threshold acceleration value for a threshold time period. The processor is further configured to turn on the second plurality of vibration actuators when the acceleration remains above the threshold acceleration value after the first plurality of vibration actuators are turned on. The processor is configured to transmit an event record to a recording device.

15 Claims, 10 Drawing Sheets

(52) U.S. Cl.
CPC ................ *A61H 2201/1635* (2013.01); *A61H 2201/164* (2013.01); *A61H 2201/165* (2013.01); *A61H 2201/5002* (2013.01); *A61H 2201/5012* (2013.01); *A61H 2201/5084* (2013.01); *A61H 2201/5097* (2013.01)

(58) Field of Classification Search
USPC .............................................................. 601/7
See application file for complete search history.

(56) References Cited

U.S. PATENT DOCUMENTS

| | | | | |
|---|---|---|---|---|
| 2019/0298605 | A1* | 10/2019 | Rabolt | A61H 23/0263 |
| 2021/0244316 | A1* | 8/2021 | Khaled | A61H 23/00 |
| 2022/0273173 | A1* | 9/2022 | Rodriguez Chapa | A61B 5/6829 |
| 2022/0339058 | A1* | 10/2022 | Schutzenhofer | A61H 9/0092 |
| 2024/0100293 | A1* | 3/2024 | Rathore | A61B 5/486 |

OTHER PUBLICATIONS

"Dopamine deficiency: What you need to know", Web page, <https://www.medicalnewstoday.com/articles/320637> 11 pages, Jan. 17, 2018, retrieved on Apr. 9, 2022.

"A Review of Stem Cell-Based Therapies for Parkinson Disease", Web page, <https://www.ajmc.com/view/a-review-of-stem-cell-based-therapies-for-parkinson-disease> 2 pages, Nov. 3, 2020, retrieved on Apr. 9, 2022.

King, et al., "Short-term effects of vibration therapy on motor impairments in Parkinson's disease", NeuroRehabilitation 25 (2009) 297-306.

"Whole-body Vibration as a Treatment for Parkinson's Disease", Web page, <https://clinicaltrials.gov/ct2/show/NCT02306863> 7 pages, Dec. 3, 2014, retrieved on Apr. 9, 2022.

"Parkinson's disease (PD)", Web page, <https://www.mayfieldclinic.com/pe-pd.htm> 5 pages, updated Apr. 2018, retrieved on Apr. 9, 2022.

"Parkinson's disease", Web page, <https://www.mayoclinic.org/diseases-conditions/parkinsons-disease/diagnosis-treatment/drc-20376062> 12 pages, Apr. 2, 2018, retrieved on Apr. 9, 2022.

"Dopamine and Parkinson's Disease", Web page, <https://www.ncbi.nlm.nih.gov/books/NBK6271/> 13 pages, Oct. 29, 2015, retrieved on Apr. 9, 2022.

"Parkinson's Disease", Web page, <https://www.apdaparkinson.org/what-is-parkinsons/> 7 pages, Apr. 1, 2017, retrieved on Apr. 9, 2022.

"Project Emma", Web page, <https://www.microsoft.com/en-us/research/project/project-emma/> 4 pages, Feb. 26, 2018, retrieved on Apr. 9, 2022.

"Statistics", Web page, <https://www.parkinson.org/Understanding-Parkinsons/Statistics> 9 pages, Dec. 15, 2018, retrieved on Apr. 9, 2022.

* cited by examiner

VIBRATION-INDUCED TREMOR RELIEF APPARATUS

CROSS-REFERENCE TO RELATED APPLICATIONS

This application claims the benefit of priority under 35 U.S.C. § 119(e) of U.S. Provisional Application No. 63/254,462, filed Oct. 11, 2021, which is hereby incorporated by reference in its entirety.

FIELD

This disclosure relates to the field of therapeutic devices for tremors. More particularly, but not exclusively, this disclosure relates to wearable therapeutic devices for tremors.

BACKGROUND

Tremors may adversely impact patients' lifestyles and impair their ability to perform simple daily tasks. One cause of tremors is Parkinson's disease, which is a progressive, neurodegenerative disease. In the United States alone, there are 1 million people who have Parkinson's disease. In addition, there are an estimated 10 million people worldwide who have the disease. There is no known cure for Parkinson's disease. Movement control is accomplished by complex interactions among various groups of nerve cells in the central nervous system, and one of those critical cells helping to produce the hormone dopamine. Dopamine is a neurotransmitter responsible for relaying messages that plan and control body movement. When dopamine levels decrease in the brain, tremors begin taking a toll on the body, limiting movement control. There are very few treatments that mitigate the symptoms. Stem cell therapies, gene therapies, and growth factors have all been tried, to compensate for the lack of dopamine; their positive effects are minimal and cost thousands of dollars per therapy treatment. Whole-body vibration therapy has been a recent topic of interest as many new studies have shown the treatment to have temporary positive effects on the tremors. However, it is expensive and not easily accessible.

SUMMARY

The present disclosure introduces a vibration-induced tremor relief apparatus, hereinafter the Smart Strap, including a flexible strap having vibration actuators and a motion sensor, for attaching to a patient. The Smart Strap includes a processor electrically coupled to the motion sensor, and at least one switch to control power to the vibration actuators. The processor is configured to control the switches. The Smart Strap also includes a processor power source connected to the processor, and an actuator power source electrically coupled to the vibration actuators through the switches. The processor is configured to read acceleration of the motion sensor at prescribed frequency, turn on a first switch when the acceleration of the motion sensor exceeds a threshold acceleration value for a threshold time period, causing a first plurality of the vibration actuators to turn on for a first prescribed treatment time period. The processor may be further configured to increase an intensity of the vibration actuators when the acceleration of the motion sensor remains above the threshold acceleration value by turning on a second switch, causing a second plurality of the vibration actuators to turn on for a second prescribed treatment time period. The processor transmits an event record to a recording device. A method of treating tremors using the Smart Strap is disclosed.

DETAILED DESCRIPTION

The present disclosure is described with reference to the attached figures. The figures are not drawn to scale and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

A Smart Strap includes a flexible strap with vibration actuators and a motion sensor. A processor is electrically coupled to the motion sensor, and is configured to read acceleration of the motion sensor at prescribed frequency. The vibration actuators are coupled to a power source through at least one switch that is controlled by the processor. When the acceleration of the motion sensor exceeds a threshold acceleration value for a threshold time period, the processor turns on a first switch, causing a first set of the vibration actuators to turn on for a first prescribed treatment time period. Optionally, when acceleration of the motion sensor remains above the threshold acceleration value, the processor turns on a second switch, causing a second set of the vibration actuators to turn on for a second prescribed treatment time period. The processor transmits an event record to a recording device for each excursion of the acceleration above the threshold acceleration value.

Figure 1:
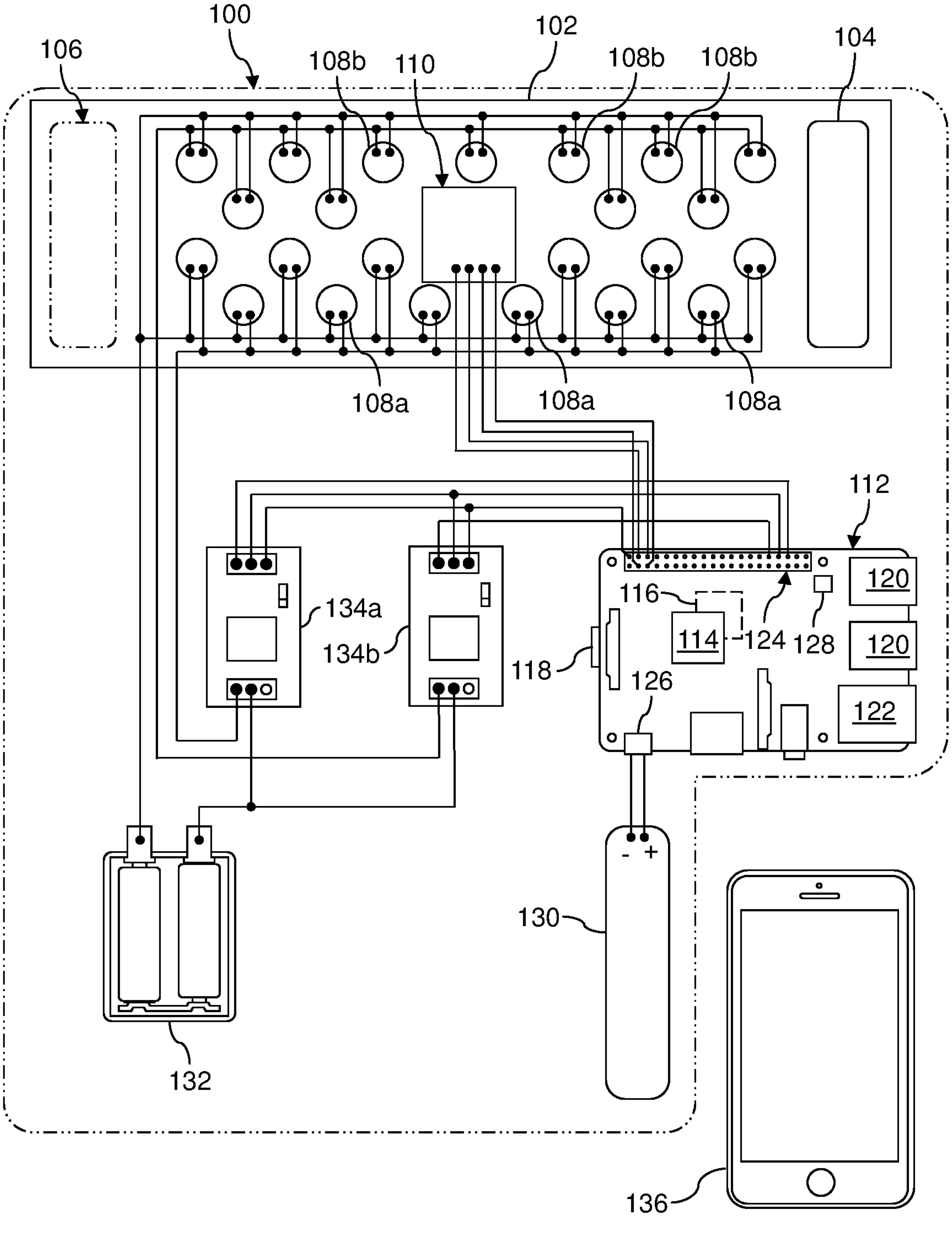
FIG. 1 depicts an example Smart Strap.

FIG. 1 depicts an example Smart Strap. The Smart Strap 100 includes a flexible strap 102 that is sufficiently long to extend around a patient's wrist or ankle. The flexible strap 102 may be 8 inches to 12 inches long, for example. The flexible strap 102 may include fabric and/or flexible sheet material. The flexible strap 102 has an attaching structure 104 on a first end of the flexible strap 102 configured to attach to a second end 106 of the flexible strap 102, opposite from the first end. The attaching structure 104 may be manifested as a hook-and-loop patch, a buckle, a magnet, one or more buttons, one or more snaps, or a zipper, for example.

The Smart Strap 100 includes a first plurality of vibration actuators 108*a* and may include a second set of vibration actuators 108*b* attached to the flexible strap 102. The first plurality of vibration actuators 108*a* may include 5 to 20 of the vibration actuators 108*a* and the second plurality of vibration actuators 108*b* may include 5 to 20 of the vibration actuators 108*b*, which has been demonstrated to be effective in reducing tremor levels in patients using the Smart Strap 100. The vibration actuators 108*a* and 108*b* are operable to vibrate at 30 cycles per second to 300 cycles per second when electrical power is applied to the vibration actuators 108*a* and 108*b*. The vibration actuators 108*a* and 108*b* may be manifested as coin motors, also known as Eccentric Rotating Mass (ERM) motors, or Linear Resonant Actuators (LRAs), for example. Other manifestations of the vibration actuators 108*a* and 108*b* are within the scope of this example. The vibration actuators 108*a* and 108*b* may be attached to the flexible strap 102 by hook-and-loop tabs, thread or wire, adhesive, clips, or other attachment means. The vibration actuators 108*a* and 108*b* may be enclosed in the flexible strap 102 in fabric pockets, or may be exposed on one side or both sides of the flexible strap 102.

The Smart Strap 100 includes a motion sensor 110 attached to the flexible strap 102. The motion sensor 110 may be manifested as a 3-axis MEMS accelerometer, configured to measure acceleration in three orthogonal directions, for example. The motion sensor 110 may be configured to measure acceleration from less than 0.1 g to greater than 10 g, where g is the acceleration due to gravity at the earth's surface. For the purposes of this disclosure, g is taken to have a value of 9.8 meters/second$^2$, for the purpose of setting the threshold acceleration value.

The Smart Strap 100 includes a processor 112 that is configured to read acceleration of the motion sensor 110 and is configured to control the vibration actuators 108*a* and 108*b*. In this example, the processor 112 may be manifested as a Raspberry Pi 3 B microcontroller, available from the Raspberry Pi Foundation. The processor 112 includes a system on chip 114 which has a 64 bit 1.2 GHZ Quad Core ARM V8 central processing unit (CPU) and a graphics processing unit (GPU). The processor 112 includes a random access memory (RAM) 116, containing volatile memory, and a secure digital (SD) card 118, containing non-volatile memory, both located on a side of the processor 112 opposite from the system on chip 114. The processor 112 includes wireless communication capability, which enables communication over WiFi and Bluetooth channels. The processor 112 also includes network and universal serial bus (USB) controller capability. The processor 112 further includes USB ports 120 and an Ethernet port 122 which enable communication to the system on chip 114. The processor 112 includes a general purpose input/output (GPIO) port 124 having 40 pins for input and output of digital and analog signals. The motion sensor 110 is electronically coupled to the pins of the GPIO port 124, as indicated schematically in FIG. 1, to provide power to the motion sensor 110 and read data from the motion sensor 110.

The processor 112 includes two ports for power input: a micro USB port 126 and a power-over-Ethernet header 128. The processor 112 may be powered through either of these two ports. When using the power-over-Ethernet header 128, voltage on the Ethernet line is commonly 48 volts, and must be stepped down to approximately 5 volts for active components of the processor 112.

The Smart Strap 100 includes a processor power source 130, which may be manifested as a rechargeable battery, a battery pack, a super capacitor, or a fuel cell, for example. The processor power source 130 is electrically connected to the processor 112, so as to provide power. In this example, the processor power source 130 may be electrically connected to the processor 112 through the micro USB port 126, as indicated schematically in FIG. 1.

The Smart Strap 100 includes an actuator power source 132 which provides power for the vibration actuators 108*a* and 108*b*. The actuator power source 132 may be manifested as a battery pack, as depicted in FIG. 1, a rechargeable battery, a super capacitor, or a fuel cell, for example. The Smart Strap 100 includes a first relay 134*a* which is controlled by the processor 112 and which electrically couples the actuator power source 132 to the first plurality of vibration actuators 108*a*, as indicated schematically in FIG. 1. The Smart Strap 100 may optionally include a second relay 134*b* which is controlled by the processor 112 and which electrically couples the actuator power source 132 to the second plurality of vibration actuators 108*b*, as indicated schematically in FIG. 1. Coupling the actuator power source 132 to the vibration actuators 108*a* and 108*b* through the relays 134*a* and 134*b* enables more power to be provided to the vibration actuators 108*a* and 108*b* than powering the vibration actuators 108*a* and 108*b* directly by the processor 112. Voltage and control terminals of the relays 134*a* and 134*b* are electrically connected to the pins of the GPIO port 124, as indicated schematically in FIG. 1. During operation of the Smart Strap 100, the processor 112 provides 12 volts and ground potentials to the relays 134*a* and 134*b* to make the relays 134*a* and 134*b* functional. The processor 112 is configured to provide first and second trigger signals, at 3.3 volt to 5 volts, to the relays 134*a* and 134*b*, to close the relays 134*a* and 134*b* and provide power to the vibration actuators 108*a* and 108*b* from the actuator power source 132.

During operation of the Smart Strap 100, the processor 112 communicates with a recording device 136, shown in FIG. 1, over a WiFi or Bluetooth channel. The recording device 136 may be implemented as a cellular phone, as depicted in FIG. 1, a smart watch appliance worn by a patient using the Smart Strap 100, or a stationary appliance such as a personal computer, by way of example.

Figure 2:
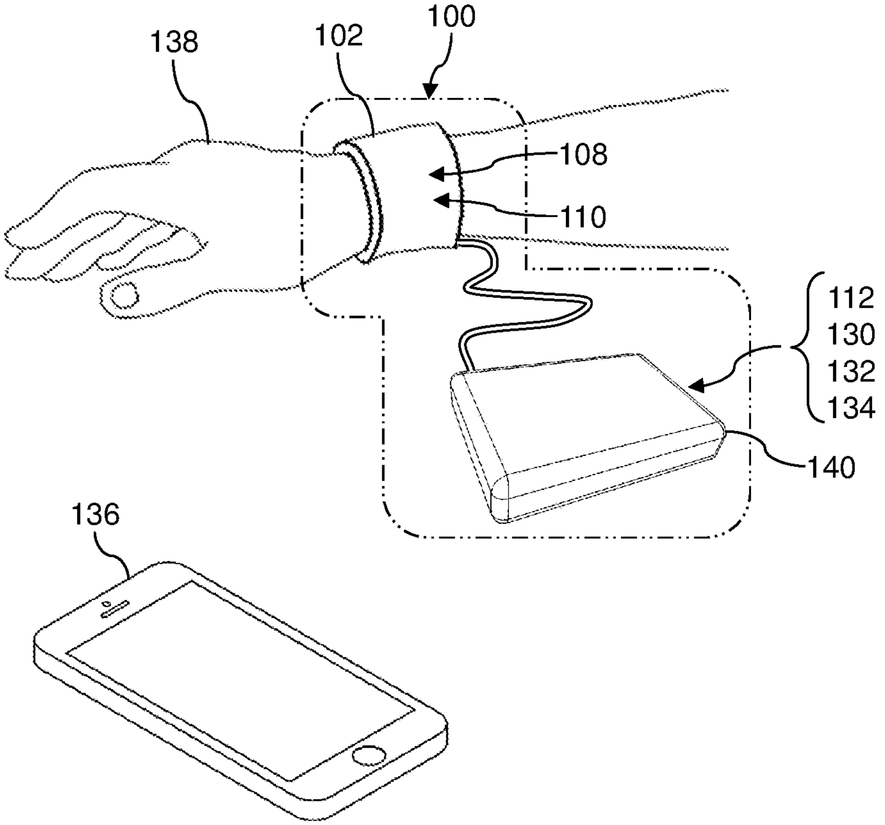
FIG. 2 depicts the Smart Strap in use on a wrist of a patient.

FIG. 2 depicts the Smart Strap in use on a wrist of a patient. The flexible strap 102 is wrapped around the wrist of the patient 138 and secured by attaching the attaching structure 104 of FIG. 1 to the second end 106 of the flexible strap 102. The processor 112, the processor power source 130, and the relays 134*a* and 134*b* may be located in a container 140 for convenience. The container 140 may be implemented as a clamshell case, a handbag, or a pouch secured to the patient 138, by way of example. The recording device 136 is maintained within communication range of the processor 112, to enable reception of an event record transmitted by the processor 112. In versions of this example, the recording device 136 may be stored in the container 140. Having the flexible strap 102 around the wrist of the patient 138 may advantageously assist with hand activities, such as writing and manipulating objects, by the patient when experiencing tremors.

Figure 3:
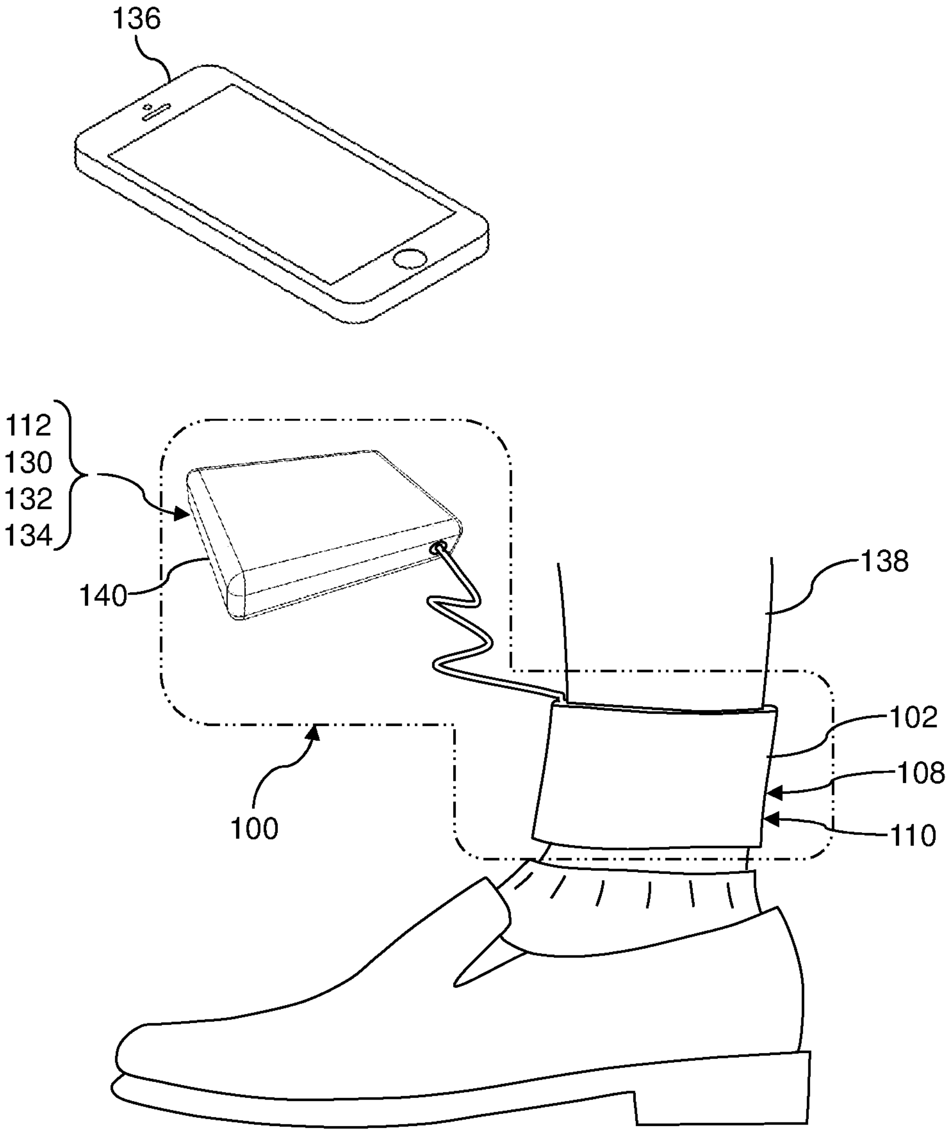
FIG. 3 depicts the Smart Strap in use on an ankle of a patient.

FIG. 3 depicts the Smart Strap in use on an ankle of a patient. The flexible strap 102 is wrapped around the ankle of the patient 138 and secured by attaching the attaching structure 104 of FIG. 1 to the second end 106 of the flexible strap 102. The processor 112, the processor power source 130, and the relays 134*a* and 134*b* may be located in the container 140 and carried by the patient. The recording device 136 may be carried by the patient in a pocket, worn on a writs, or stored in the container 140, by way of example. Having the flexible strap 102 around the ankle of the patient 138 may advantageously assist the patient with walking, when experiencing tremors, a condition known as "gait freeze".

Figure 4:
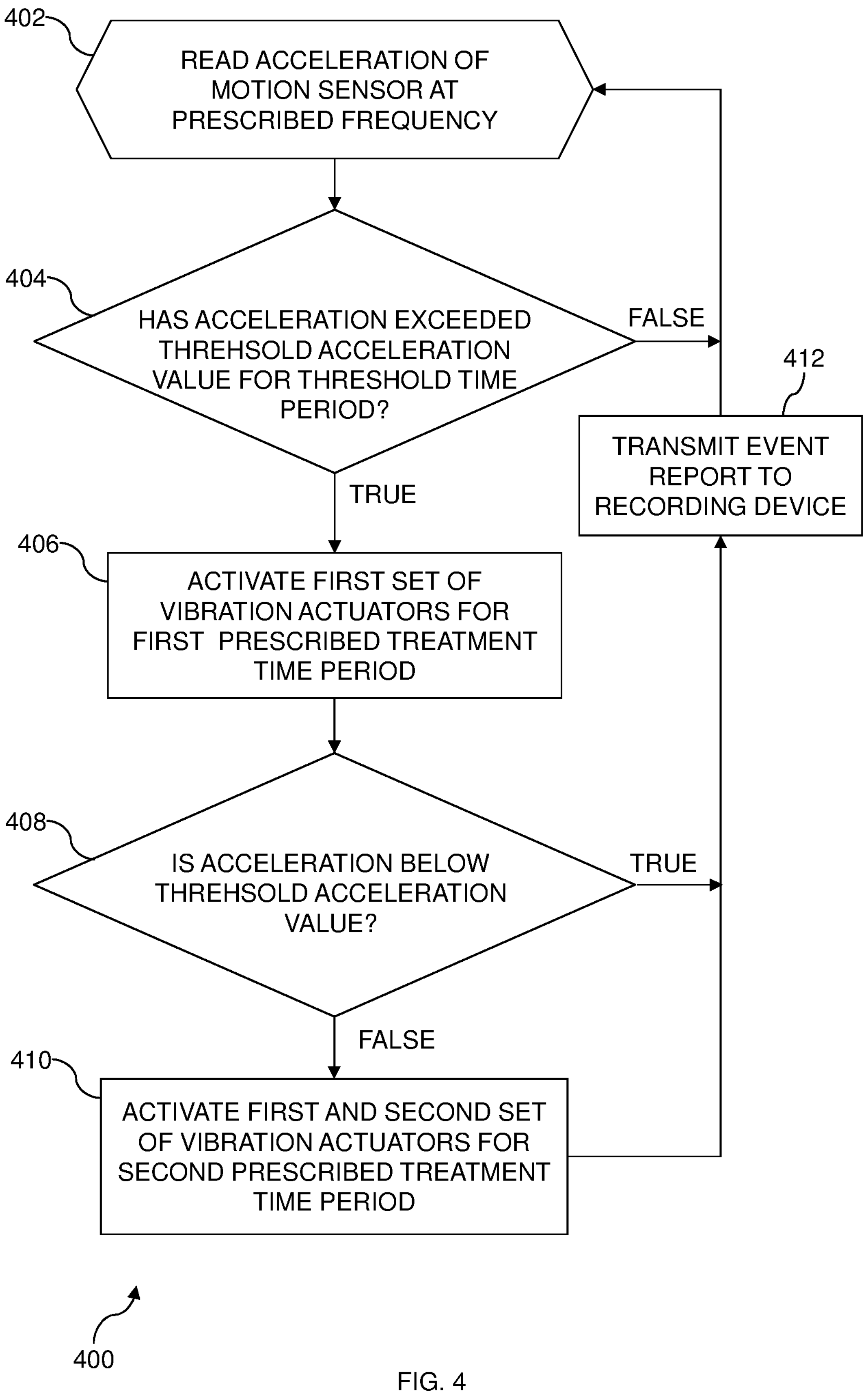
FIG. 4 is a flowchart of an example method of operation of the Smart Strap of FIG. 1.

FIG. 4 is a flowchart of an example method of treating tremors using the Smart Strap 100 of FIG. 1. During the method 400, a patient wraps the Smart Strap around their wrist or ankle and turns on the processor 112. The method 400 begins with step 402, in which values of the acceleration of the motion sensor 110 of FIG. 1 are read by the processor 112 at a prescribed frequency. The prescribed frequency may be 4 Hertz (Hz) to 10 Hz, by way of example. Hertz is a unit of frequency; 1 Hz equals 1 per second. Research on symptoms of Parkinson's disease has indicated that tremors in patients tend to occur at 4 Hz to 5 Hz, so reading the acceleration at 4 Hz to 10 Hz characterizes patient movements sufficiently to detect tremors in the user.

After each reading of the acceleration in step 402, step 404 is executed, which includes determining if the acceleration has been above a threshold acceleration value for every acceleration reading in a threshold time period. The threshold acceleration value is selected to discriminate normal motions from tremors. Tests performed in development of the Smart Strap 100 have shown a threshold acceleration value of 1.6 g to 2.3 g is effective in discriminating normal motions from tremors, as discussed in reference to FIG. 12. The threshold time period is selected to discriminate transient motions from tremors. A threshold time period of 1.5 seconds to 3 seconds has been demonstrated to be effective in discriminating transient motions from tremors.

In one version of the method 400, values of recent acceleration values may be stored in the RAM 116 of FIG. 1, and recalled during execution of step 404 to determine if the acceleration has been above the threshold acceleration value for the threshold time period. In another version of the method 400, Boolean values TRUE and FALSE corresponding to recent acceleration values, in which a TRUE value indicates the acceleration value exceeds the threshold acceleration value and a FALSE value indicates the acceleration value does not exceed the threshold acceleration value, may be stored, and recalled during execution of step 404 to determine if the acceleration has been above the threshold acceleration value for the threshold time period. Other methods of determining if the acceleration has been above the threshold acceleration value for the threshold time period are within the scope of step 404.

If the result of step 404 is TRUE, that is, the acceleration has been above the threshold acceleration value for the threshold time period, execution of the method 400 branches to step 406. If the result of step 404 is FALSE, that is, the acceleration has not been above the threshold acceleration value for the threshold time period, execution of the method 400 branches back to step 402.

Step 406 includes activating the first plurality of vibration actuators 108*a* of FIG. 1 for a first prescribed treatment time. The processor 112 turns on the first relay 134*a* by applying a first trigger signal of 3.3 volts to 5 volts to the first relay 134*a*. Applying the first trigger signal causes the first relay 134*a* to close and provide power from the processor power source 130 to the first plurality of vibration actuators 108*a*. Providing power to the first plurality of vibration actuators 108*a* causes the first plurality of vibration actuators 108*a* to vibrate at 30 cycles per second to 300 cycles per second. The vibration may advantageously disrupt the tremors in the patient, enabling more normal functioning for the patient. The processor 112 maintains the first trigger signal to the first relay 134*a* for the first prescribed treatment time. Tests performed in development of the Smart Strap 100 have shown a first prescribed treatment time of 30 seconds to 5 minutes is effective in reducing the tremors.

After the processor 112 applies the first trigger signal to the first relay 134*a*, step 408 is executed, in which subsequent values of the acceleration of the motion sensor 110 are read by the processor 112 at the prescribed frequency, to determine if the acceleration is reduced below the threshold acceleration value. In one version of this method 400, the processor 112 may assess the acceleration while the first plurality of vibration actuators 108*a* are still activated. For example, the processor 112 may assess the acceleration midway in the first prescribed treatment time. In another version of this method 400, the processor 112 may assess the acceleration after the first prescribed treatment time has elapsed. If the result of step 408 is FALSE, that is, the acceleration remains above the threshold acceleration value, execution of the method 400 branches to step 410. If the result of step 408 is TRUE, that is, the acceleration is reduced below the threshold acceleration value, execution of the method 400 branches to step 412.

Step 410 includes activating the first and second pluralities of vibration actuators 108*a* and 108*b* of FIG. 1 for a second prescribed treatment time. In the version of this method 400 in which the processor 112 assesses the acceleration while the first plurality of vibration actuators 108*a* are still activated, the first trigger signal is maintained for the execution of step 410. The processor 112 turns on the first relay 134*a* as disclosed in reference to step 406, and turns on the second relay 134*b* by applying a second trigger signal of 3.3 volts to 5 volts to the second relay 134*b*. Applying the trigger signals causes the relays 134*a* and 134*b* to close and provide power from the processor power source 130 to the vibration actuators 108*a* and 108*b*. Providing power to the vibration actuators 108*b* and 108*b* causes the vibration actuators 108*b* and 108*b* to vibrate at 30 cycles per second to 300 cycles per second, with a combined intensity than the first plurality of vibration actuators 108*a* alone. The higher intensity vibration may advantageously relieve the tremors in the patient. The processor 112 maintains the trigger signals to the relays 134*a* and 134*b* for a second prescribed treatment time, which may be equal to the first prescribed treatment time.

After execution of step 410, the method 400 continues with step 412, which includes the processor 112 transmitting an event record to the recording device 136 of FIG. 1. The event record includes a date and time that the acceleration exceeded the threshold acceleration value for the threshold time period. The event record may optionally identify the patient. The event record may optionally include additional information, such as magnitude and duration of the acceleration that exceeded the threshold acceleration value. The event record may optionally include information regarding which pluralities of the vibration actuators 108*b* and 108*b* were activated, and the time duration of activation of each plurality. After execution of step 412, the method 400 returns to step 402.

Figure 5:
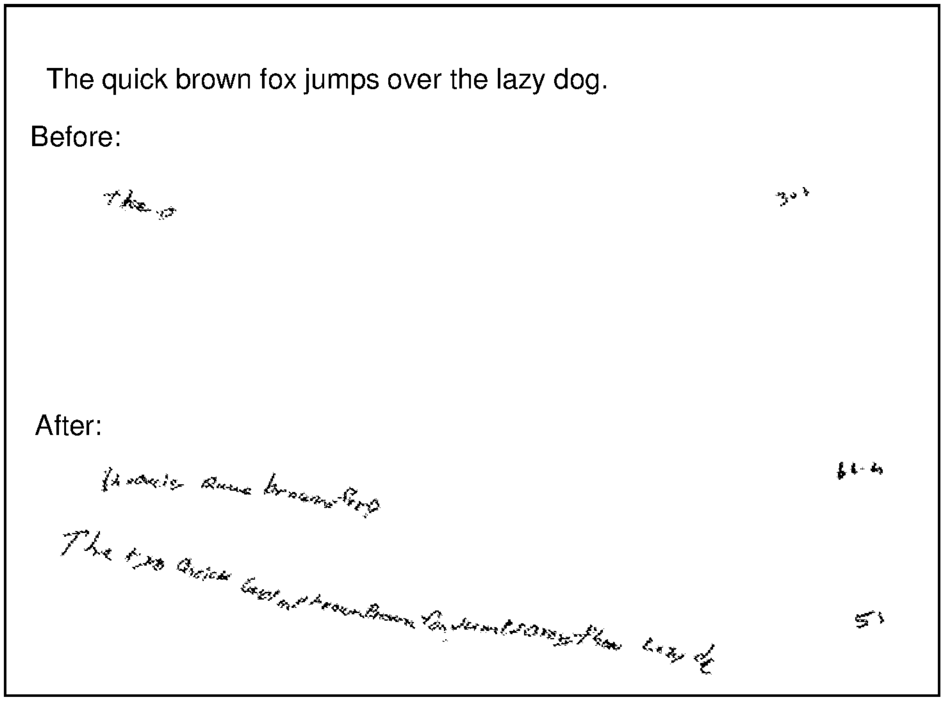
FIG. 5 is a handwriting sample of a Parkinson's patient, before and after treatment with a Smart Strap.
Figure 6:
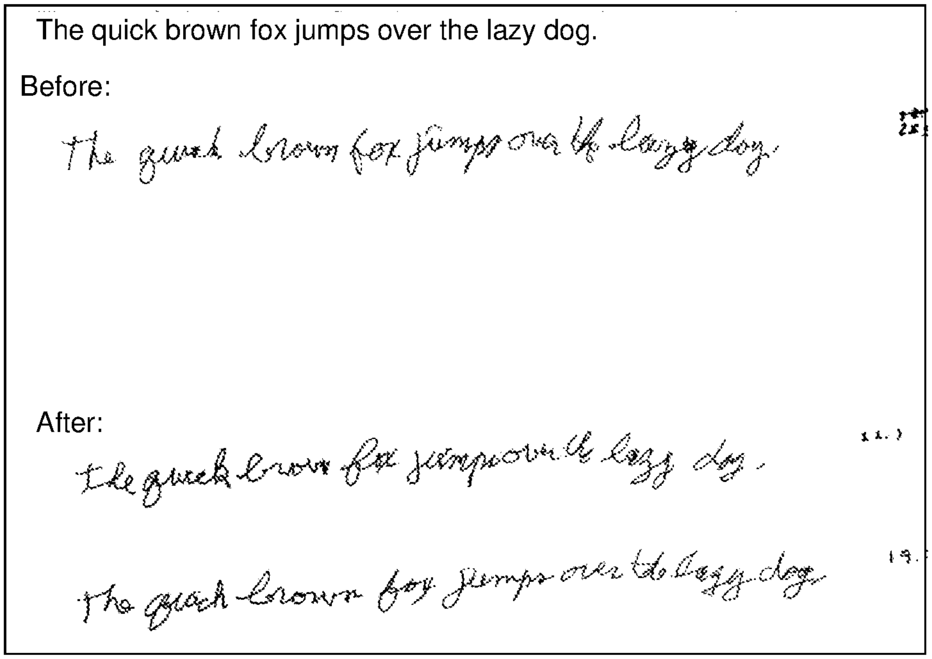
FIG. 6 is a handwriting sample of another Parkinson's patient, before and after treatment with a Smart Strap.
Figure 7:
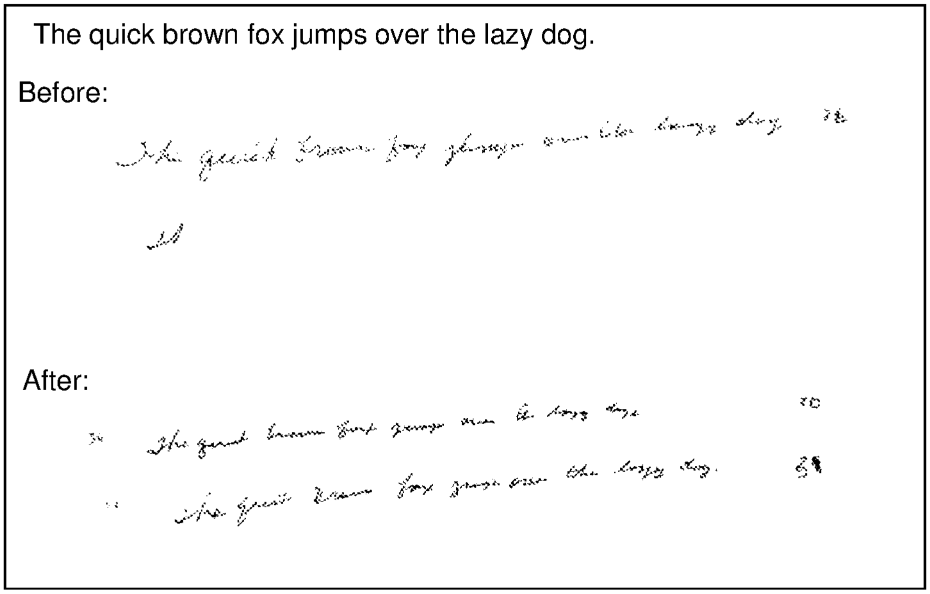
FIG. 7 is a handwriting sample of a third Parkinson's patient, before and after treatment with a Smart Strap.

Handwriting can be used to assess effectiveness of treatments for tremors. FIG. 5 through FIG. 7 are handwriting samples of different Parkinson's patients, before and after treatment with a Smart Strap. In each case, the Parkinson's patient attempts to write "The quick brown fox jumps over the lazy dog." While experiencing tremors, and after treatment with a Smart Strap. For each sentence written, the time to write the sentence was recorded. Referring to FIG. 5, the handwriting sample labeled "Before:" was made while a first Parkinson's patient was experiencing tremors. The first Parkinson's patient was not able to complete the sentence because of the tremors. After a vibration treatment from the Smart Strap, the first Parkinson's patient completed the sentence, labeled "After:" on a second try, in 51 seconds.

Referring to FIG. 6, a second Parkinson's patient was able to complete writing the sentence during tremors, in 25 seconds. After a vibration treatment from the Smart Strap, the second Parkinson's patient was able to complete writing the sentence twice, with reduced times of 22 seconds and 19 seconds.

Referring to FIG. 7, a third Parkinson's patient was able to complete writing the sentence during tremors, in 34 seconds. After a vibration treatment from the Smart Strap, the third Parkinson's patient was able to complete writing the sentence twice, with reduced times of 30 seconds and 31 seconds, with improved penmanship.

Figure 8:
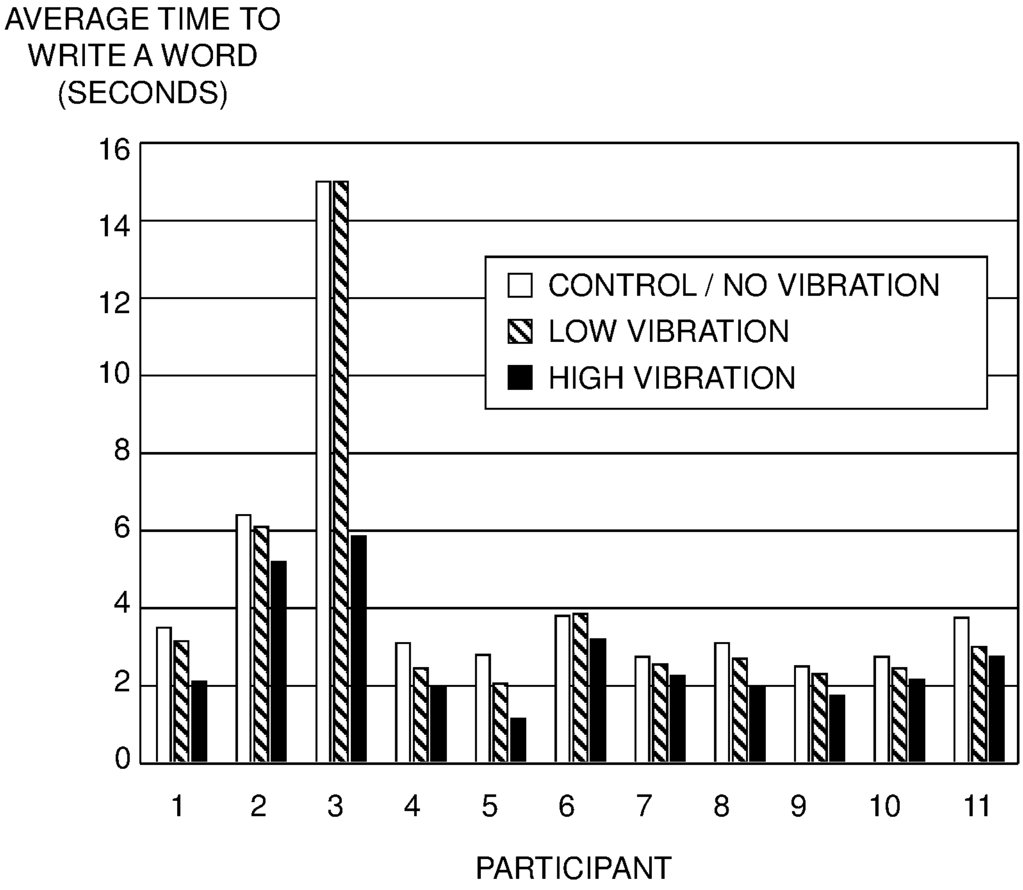
FIG. 8 is a chart of average times to write a word during the writing trials described in reference to FIG. 5 through FIG. 7.

FIG. 8 is a chart of average times to write a word during the writing trials described in reference to FIG. 5 through FIG. 7. Eleven participants completed the writing trials, under three modes: no vibration, low vibration, and high vibration. In the high vibration mode, all the vibration actuators **108*a* and 108*b* of FIG. 1 were activated. In the low vibration mode, the first plurality of the vibration actuators 108*a* were activated. In the no vibration mode, none of the vibration actuators 108*a* and 108*b*** were activated. For all eleven participants, the average time to write a word significantly improved in the high vibration mode compared to the no vibration mode. In the high vibration mode, two of the participants had average times between 4 seconds and 6 seconds, five of the participants had average times between 2 seconds and 4 seconds, and four of the participants had average times between 1 second and 2 seconds. In the high vibration mode, ten of the participants had modest improvements in the average times, and one participant had a slight increase in the average time. The high vibration mode in the treatment with a Smart Strap is observed to provide an improvement in the average times to write a word during the writing trials.

Figure 9:
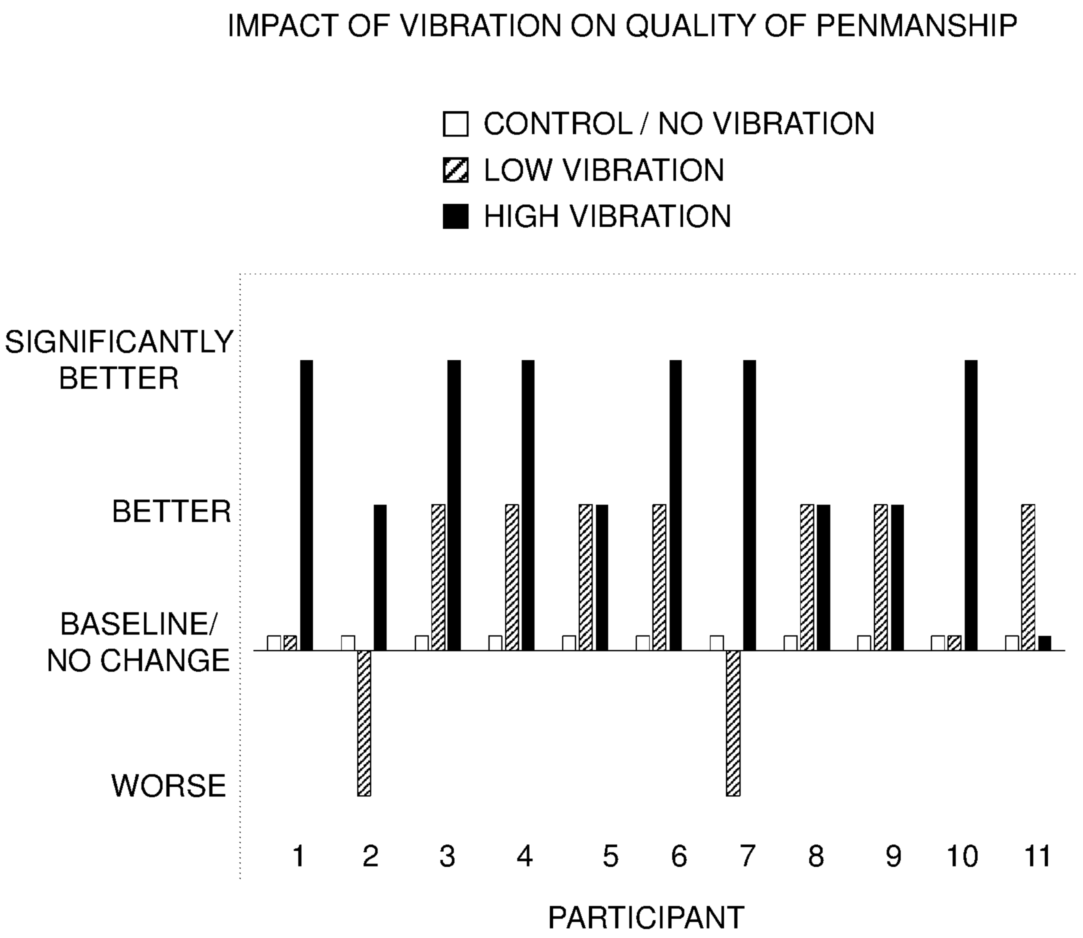
FIG. 9 is a chart of the impact of the treatments with a Smart Strap on the quality of penmanship in the writing trials described in reference to FIG. 5 through FIG. 7.

FIG. 9 is a chart of the impact of the treatments with a Smart Strap on the quality of penmanship in the writing trials described in reference to FIG. 5 through FIG. 7. For the eleven participants, penmanship was designated as no change, better, significantly better, worse, or significantly worse. The no vibration mode was used as a control mode, so all participants were designated to have no change in the no vibration mode. In the high vibration mode, four of the participants exhibited better penmanship, six of the participants exhibited significantly better penmanship, and one of the participants exhibited no change in penmanship quality. None of the participants exhibited degraded penmanship in the high vibration mode. In the low vibration mode, two of the participants exhibited worse penmanship, two of the participants exhibited no change in penmanship quality, and seven of the participants exhibited better penmanship. None of the participants exhibited significantly worse penmanship in either the low vibration mode or the high vibration mode. The high vibration mode in the treatment with a Smart Strap is observed to provide an improvement in penmanship for most participants during the writing trials.

Figure 10:
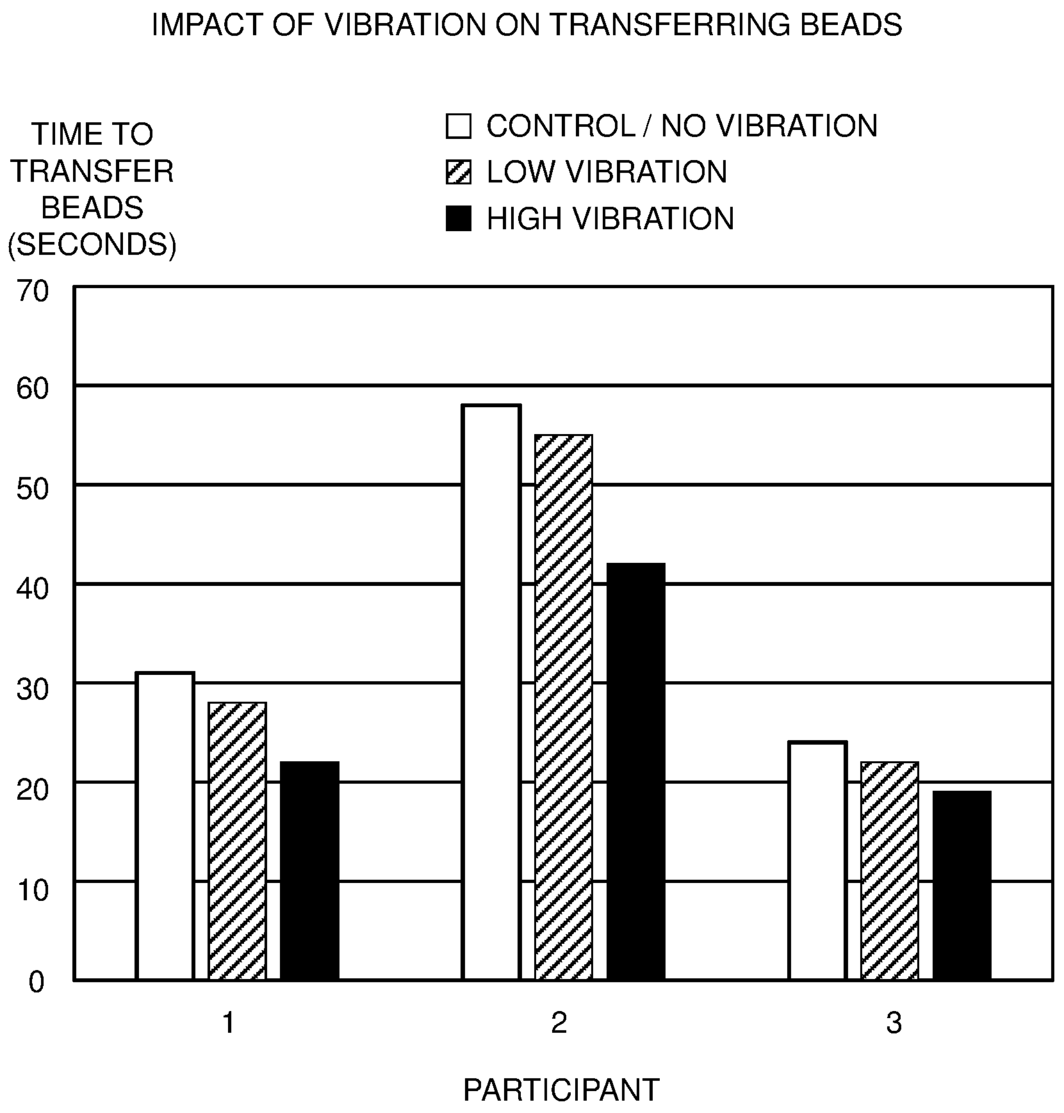
FIG. 10 is a chart of times to transfer beads from a first container to a second container using a spoon, for three participants.

Manual manipulation of objects can also be used to assess effectiveness of treatments for tremors. FIG. 10 is a chart of times to transfer beads from a first container to a second container using a spoon, for three participants. The bead transfer trials were completed under three modes: no vibration, low vibration, and high vibration, as disclosed in reference to FIG. 8. For all three participants, the time to transfer beads improved by an average of 7 percent in the low vibration mode compared to the no vibration mode, and improved by 19 percent in the high vibration mode compared to the low vibration mode. The high vibration mode in the treatment with a Smart Strap is observed to provide an improvement in the times to transfer beads.

Figure 11:
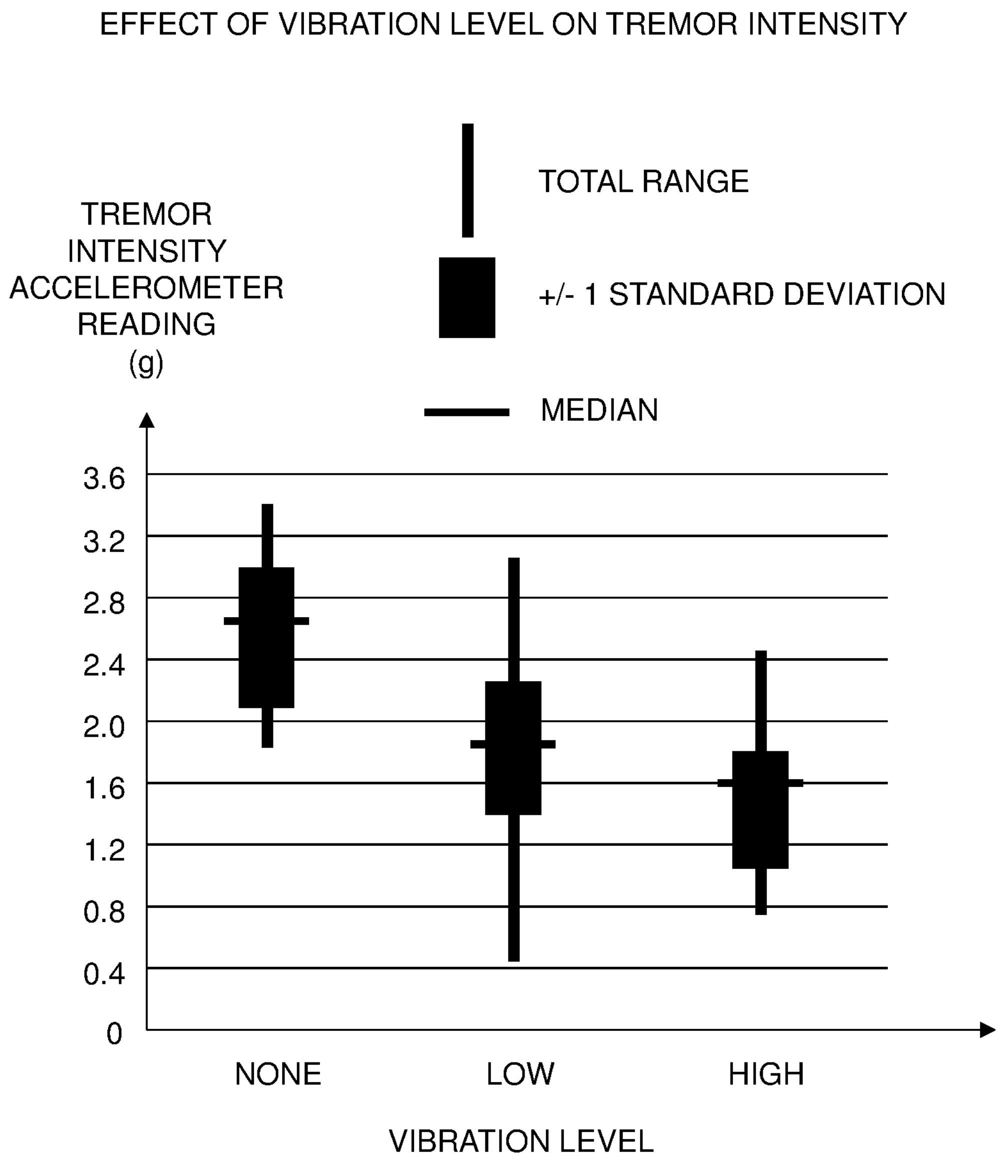
FIG. 11 is a chart showing the effectiveness of vibration level on reducing tremor intensity.

FIG. 11 is a chart showing the effectiveness of vibration level on reducing tremor intensity. A group of patients with tremors were monitored with the Smart Strap 100 under three modes: no vibration, low vibration, and high vibration, as disclosed in reference to FIG. 8. The chart in FIG. 11 shows the total ranges of tremor intensities for each of the three modes, ranges of +/−1 standard deviation, and median values. High values of the total ranges of tremor intensities decreases as the vibration level increases from no vibration to low vibration, and decreases more from low vibration to high vibration. The +1 standard deviation values and the −1 standard deviation values similarly decrease as the vibration level increases. The median values decrease by 28 percent as the vibration level increases from no vibration to low vibration, and decrease by 15 percent as the vibration level increases from low vibration to high vibration. Reduction in tremor intensity is well correlated with increase in vibration level.

Figure 12:
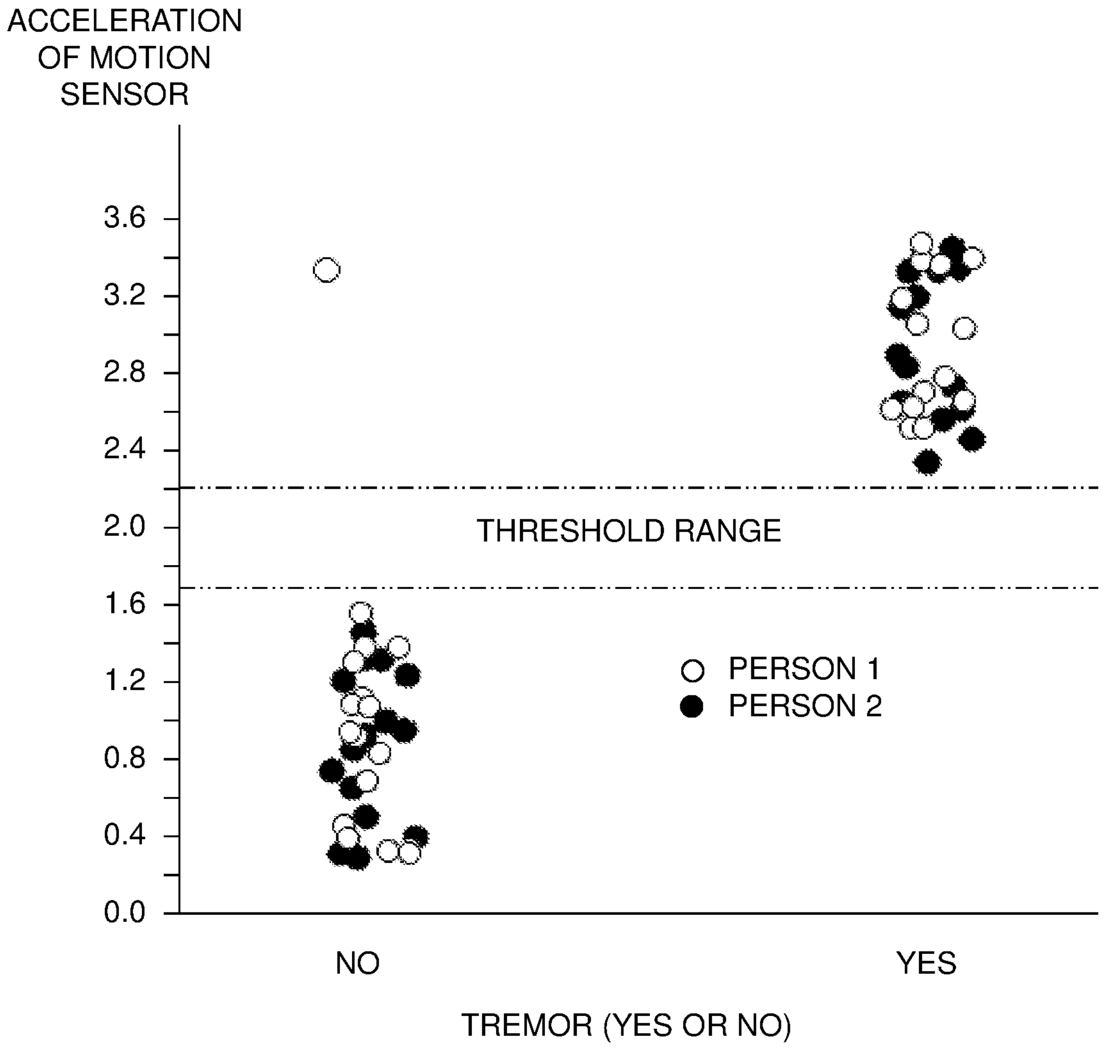
FIG. 12 is chart of acceleration of the motion sensor of FIG. 1 for cases of no tremors versus cases of tremors, in two Parkinson's patients.

FIG. 12 is chart of acceleration of the motion sensor 110 of FIG. 1 for cases of no tremors versus cases of tremors, in two Parkinson's patients. Acceleration values were taken while each Parkinson's patient was wearing the Smart Strap on their wrist. For a first Parkinson's patient, 31 acceleration values were acquired. Of these 31 acceleration values, 17 were acquired while the first Parkinson's patient was not experiencing tremors, and 14 were acquired while the first Parkinson's patient was experiencing tremors. For a second Parkinson's patient, 29 acceleration values were acquired. Of these 29 acceleration values, 15 were acquired while the second Parkinson's patient was not experiencing tremors, and 14 were acquired while the second Parkinson's patient was experiencing tremors.

Thus, 32 acceleration values were acquired while the two Parkinson's patients were not experiencing tremors. One of these 32 acceleration values was between 3.2 g and 3.4 g, and the remaining 31 acceleration values were between 0.2 g and 1.6 g. Also, 28 acceleration values were acquired while the two Parkinson's patients were experiencing tremors. All of these 32 acceleration values were between 3.2 g and 3.6 g.

As seen in FIG. 12, a threshold range between 1.7 g and 2.2 g separates the acceleration values without tremors from the acceleration values with tremors, with the exception of the one acceleration value without tremors for the first Parkinson's patient. Thus, a threshold acceleration value within the threshold range is deemed effective in discriminating normal wrist motions from tremors.

While embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments. Rather, the scope of the disclosure should be defined in accordance with the following claims and their equivalents.

What is claimed is:

1. A smart strap, comprising:

a flexible strap with an attaching structure on a first end of the flexible strap configured to attach to a second end of the flexible strap, opposite from the first end;

a motion sensor attached to the flexible strap;

a first plurality of 5 to 20 vibration actuators attached to the flexible strap;

a first relay configured to control power to the first plurality of vibration actuators;

a second plurality of 5 to 20 vibration actuators attached to the flexible strap;

a second relay configured to control power to the second plurality of vibration actuators;

a processor electrically coupled to the motion sensor and electrically coupled to the first relay and the second relay;

a processor power source electrically coupled to the processor; and an actuator power source electrically coupled to the first plurality of vibration actuators through the first relay and electrically coupled to the second plurality of vibration actuators through the second relay, the actuator power source being configured to provide more power to the first plurality of vibration actuators than could be provided by the processor directly;

wherein the processor is configured to:

read a change in an acceleration of the motion sensor at a prescribed frequency while the flexible strap is around one of a patient's wrist or ankle;

turn on the first relay when the acceleration of the motion sensor exceeds a threshold acceleration value of 1.6 g to 2.3 g for a threshold time period, causing the first plurality of vibration actuators to turn on for a first prescribed treatment time period;

turn on the second relay when the acceleration of the motion sensor remains above the threshold acceleration value after the first relay is turned on, causing the second plurality of vibration actuators to turn on for a second prescribed treatment time period; and transmit an event record to a recording device, the event record including a date and time the acceleration of the motion sensor exceeded the threshold acceleration value for the threshold time period.

2. The smart strap of claim 1, wherein the first plurality of vibration actuators and the second plurality of vibration actuators are coin motors.

3. The smart strap of claim 1, wherein the first plurality of vibration actuators and the second plurality of vibration actuators are configured to vibrate at 30 cycles per second to 300 cycles per second.

4. The smart strap of claim 1, wherein the motion sensor is configured to measure acceleration in three orthogonal directions.

5. The smart strap of claim 1, wherein the motion sensor is configured to measure acceleration from less than 0.1 g to greater than 10 g, wherein g has a value of 9.8 meters/second$^2$.

6. The smart strap of claim 1, wherein the prescribed frequency is 4 Hertz (Hz) to 10 Hz.

7. The smart strap of claim 1, wherein the threshold time period is 1.5 seconds to 3 seconds.

8. The smart strap of claim 1, wherein the first prescribed treatment time period is 30 seconds to 5 minutes, and the second prescribed treatment time period is 30 seconds to 5 minutes.

9. The smart strap of claim 1, wherein the processor is configured to transmit the event record through a wireless channel.

10. The smart strap of claim 1, wherein the recording device is a cellular phone.

11. A method of treating tremors in a patient, comprising:

securing a smart strap to one of the patient's wrist or ankle the patient by a flexible strap of the smart strap;

measuring a change in an acceleration of a motion sensor of the smart strap attached to the flexible strap at a prescribed frequency;

turning on a first relay of the smart strap by a processor of the smart strap electrically coupled to the motion sensor and electrically coupled to the first relay when the acceleration of the motion sensor exceeds a threshold acceleration value of 1.6 g to 2.3 g for a threshold time period, causing a first plurality of vibration actuators of the smart strap attached to the flexible strap to turn on for a first prescribed treatment time period, wherein the first plurality of vibration actuators are powered by an actuator power source being configured to provide more power to the first plurality of vibration actuators than could be provided by the processor directly;

turning on a second relay of the smart strap by the processor when the acceleration of the motion sensor remains above the threshold acceleration value after turning on the first relay, causing a second plurality of vibration actuators of the smart strap attached to the flexible strap to turn on for a second prescribed treatment time period, wherein the second plurality of vibration actuators are powered by the actuator power source; and transmitting an event record from the processor of the smart strap to a recording device, the event record including a date and time the acceleration of the motion sensor exceeded the threshold acceleration value for the threshold time period.

12. The method of claim 11, wherein the motion sensor is configured to measure acceleration from less than 0.1 g to greater than 10 g, wherein g has a value of 9.8 meters/second$^2$.

13. The method of claim 11, wherein the prescribed frequency is 4 Hertz (Hz) to 10 Hz.

14. The method of claim 11, wherein the threshold time period is 1.5 seconds to 3 seconds.

15. The method of claim 11, wherein the first prescribed treatment time period is 30 seconds to 5 minutes, and the second prescribed treatment time period is 30 seconds to 5 minutes.

* * * * *